United States Patent
Uno

(10) Patent No.: US 7,204,623 B2
(45) Date of Patent: Apr. 17, 2007

(54) BICYCLE LIGHTING DEVICE

(75) Inventor: Koji Uno, Naniwaku (JP)

(73) Assignee: Shimano Inc., Osaka (JP)

( * ) Notice: Subject to any disclaimer, the term of this patent is extended or adjusted under 35 U.S.C. 154(b) by 70 days.

(21) Appl. No.: 11/022,682

(22) Filed: Dec. 28, 2004

(65) Prior Publication Data

US 2005/0157510 A1    Jul. 21, 2005

(30) Foreign Application Priority Data

Jan. 16, 2004   (JP) .............................. 2004-009192

(51) Int. Cl.
*B62J 6/00* (2006.01)

(52) U.S. Cl. ................ 362/473; 362/72; 362/183; 362/78; 315/78; 315/77

(58) Field of Classification Search ............ 315/78–79; 362/72, 473, 183, 234, 276, 295; 340/782
See application file for complete search history.

(56) References Cited

U.S. PATENT DOCUMENTS

| | | | | |
|---|---|---|---|---|
| 4,298,869 A | * | 11/1981 | Okuno | ..................... 345/82 |
| 5,015,918 A | * | 5/1991 | Copeland | ..................... 315/76 |
| 5,247,430 A | * | 9/1993 | Schwaller | ................... 362/473 |
| 5,313,187 A | * | 5/1994 | Choi et al. | .................. 340/331 |
| 5,936,599 A | * | 8/1999 | Reymond | ..................... 345/82 |
| 6,069,452 A | * | 5/2000 | Rossner | ..................... 315/192 |
| 6,218,785 B1 | * | 4/2001 | Incerti | ..................... 315/185 S |
| 6,244,728 B1 | * | 6/2001 | Cote et al. | .................. 362/249 |
| 6,362,603 B2 | * | 3/2002 | Suzuki et al. | .............. 320/163 |
| 6,418,041 B1 | * | 7/2002 | Kitamura | ..................... 363/125 |
| 6,573,686 B2 | * | 6/2003 | Uno | ........................... 320/123 |
| 6,830,358 B2 | * | 12/2004 | Allen | ........................ 362/640 |
| 6,885,297 B2 | * | 4/2005 | Fleury | ......................... 340/516 |
| 7,145,256 B2 | * | 12/2006 | Koharcheck et al. | ....... 290/1 R |
| 2003/0141918 A1 | | 7/2003 | Uno | |

FOREIGN PATENT DOCUMENTS

| | | |
|---|---|---|
| DE | 2633270 A1 | 1/1978 |
| DE | 4012977 A1 | 11/1991 |
| DE | 4324779 A1 | 3/1994 |
| DE | 29511022 U1 | 9/1995 |
| DE | 19830792 A1 | 1/1999 |
| FR | 2626237 A | 7/1989 |
| JP | 2003-230300 | 8/2003 |
| JP | 2003-291870 | 10/2003 |

* cited by examiner

*Primary Examiner*—Tho Phan
*Assistant Examiner*—Chuc Tran
(74) *Attorney, Agent, or Firm*—Global IP Counselors, LLP

(57) ABSTRACT

A bicycle lighting device is configured to make possible the efficient illumination of an LED while controlling power loss between the generator and the LED. An LED unit has at least one LED. A protector circuit controls the flow of current to each LED according to the internal resistance of the generator and the constant voltage properties of the LED unit.

5 Claims, 8 Drawing Sheets

BICYCLE LIGHTING DEVICE

This application claims priority to Japanese Patent Application No. 2004-009192. The entire disclosure of Japanese Patent Application No. 2004-009192 is hereby incorporated herein by reference.

BACKGROUND OF THE INVENTION

1. Field of the Invention

This invention generally relates to bicycle lighting devices. More specifically, the present invention relates to bicycle lighting devices that are illuminated by a bicycle generator.

2. Background Information

Bicycle lighting devices, particularly headlights, have been proposed as in the device indicated in Japanese Laid Open Patent Publication No. 2003-291870. This device comprises a light emitting diode (LED) housed within a headlight, a light bulb, and a power source for illuminating or flashing the LED. The power source is a secondary battery which is charged by a solar cell.

Further, bicycles using generators to illuminate bicycle headlights have already been proposed (for example, Japanese Laid Open Patent Publication No. 2003-230300). When a bicycle headlight is illuminated or other electrical components driven using this type of generator output, a protector circuit is provided because of the high voltages that are generated when the bicycle moves at high speeds.

In view of the above, it will be apparent to those skilled in the art from this disclosure that there exists a need for an improved bicycle lighting device. This invention addresses this need in the art as well as other needs, which will become apparent to those skilled in the art from this disclosure.

SUMMARY OF THE INVENTION

When generator output is used to drive the LED, the generator output varies according to the bicycle speed as outlined above, and the LED either may not illuminate, or the LED maybe destroyed by the flow of excessive current.

Therefore, when generator output is used to drive an LED, it may be necessary to control the voltage that is applied to the LED circuit or the flow of current by a protector circuit comprising resistors, Zener diodes, etc. When protector circuits constituted in this way are used, the resistance value of the resistors must be increased since the circuit must be able to handle high speeds. In other words, it must avoid the generation of heat. However, if the resistor resistance value is too large, the loss at low speeds due to the resistor becomes significant, and it becomes impossible to illuminate the LED at these low speeds.

Since the resistance value varies according to the input voltage, a linear voltage regulator method using transistors that use a circuit with a current restriction method can be considered as a way of protecting the LED. However, when this sort of circuit is used, there is a significant voltage drop (circuit loss) in the circuit, and it becomes impossible to drive the LED at low speeds, as described above.

The task of this invention is to make it possible to efficiently illuminate an LED to serve as a lighting device while controlling the current loss between the generator and the LED.

The bicycle lighting device according to a first aspect of the present invention is configured such that it is illuminated by a bicycle generator, and has a light emitting diode unit and a protector circuit. The light emitting diode unit has at least one light emitting diode. The protector circuit is configured in accordance with the internal resistance of the generator and the constant voltage properties of the light emitting diode, and restricts the flow of electric current to each of the light emitting diodes constituting the light emitting diode unit.

According to a second aspect of the present invention, multiple light emitting diodes are connected in series. In this embodiment, the forward direction voltage of the light emitting diode unit can be made higher, and the amount of energy applied to the light emitting diode can be made larger.

According to a third aspect of the present invention, multiple light emitting diodes are connected in parallel. In this embodiment, the amount of electric current flowing to each light emitting diode comprising the light emitting diode unit can be controlled.

According to a fourth aspect of the present invention, the generator installed on the bicycle has an internal resistance component. By balancing this internal resistance component and the constant voltage properties of the light emitting diode unit, the generator output can be efficiently applied to the light emitting diode. Taking into consideration the generator internal resistance and light emitting diode unit constant voltage properties a protector circuit can be configured. As a result, there is no need in this device to provide elements or circuits in between the generator and the lighting device, as in prior art devices. Thus, it is possible to control circuit loss and supply generator output efficiently to the light emitting diode unit, and to drive the light emitting diode(s) at lower speeds. In this aspect, there is no protector circuit provided for the light emitting diode which comprises electrical elements or circuits in between the generator and the light emitting diode units. Here, circuit loss can be controlled, and the light emitting diode can be driven at low speeds.

According to a fifth aspect of the present invention, a rectifier circuit is further provided in between the generator and the light emitting diode unit.

In any of the aspects of the invention, the light emitting diode unit can be configured for use as the front bicycle lamp.

The bicycle lighting device may be provided with an auxiliary light emitting diode unit that is connected in parallel with the light emitting diode unit, has at least one light emitting diode, and has a forward voltage that is lower than the forward voltage of the light emitting diode unit.

By configuring a light emitting diode unit by connecting multiple diodes in series, the forward voltage can be increased and brighter light obtained. However, on the other hand in this case, there is an increase in the low speed ranges at which the light emitting diode is not driven and does not illuminate, and the light emitting diodes do not illuminate at low speed ranges.

When an auxiliary light emitting diode unit having a lower forward voltage than the forward voltage of the light emitting diode unit is connected in parallel with the light emitting diode unit, the light emitting diodes can be driven, even at lower speed ranges, thereby causing few speed ranges at which the light will not illuminate.

As described above, the present invention can protect the light emitting diode without a special protector circuit, and can illuminate the light emitting diode effectively at low speed ranges.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
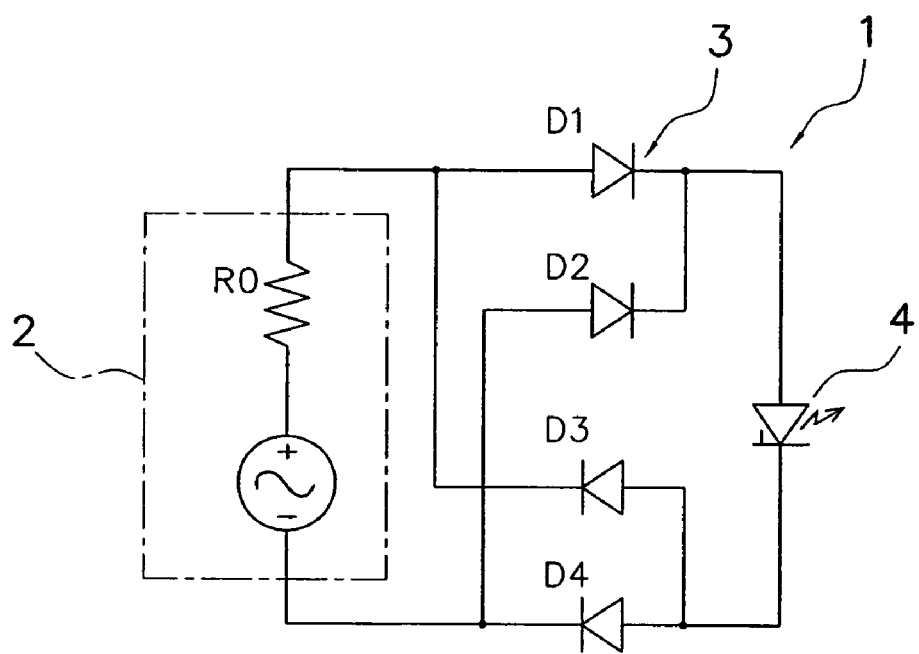
FIG. 1 is a circuit diagram of a lighting device in accordance with a first embodiment of the present invention.
Figure 10:
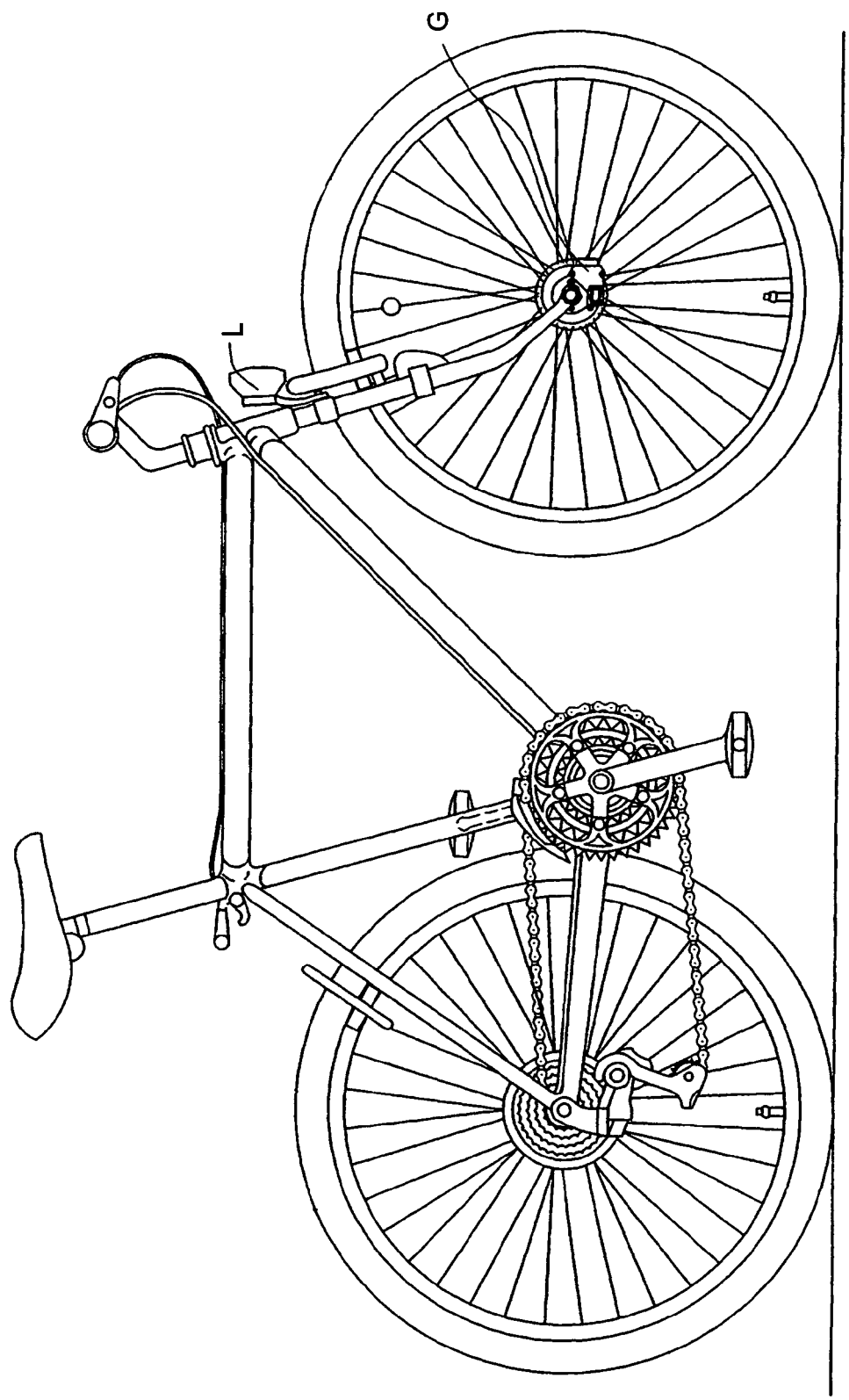
FIG. 10 is a side elevational view of a bicycle with the lighting device in accordance with the present invention.

Referring initially to FIG. 1, a bicycle lighting device 1 is illustrated in accordance with a first embodiment of the present invention. This lighting device 1 is used as a bicycle headlight L (see FIG. 10), and is connected to a generator 2 provided in the bicycle hub G (see FIG. 10). The lighting device 1 has a full wave rectifier 3, a generator 2 on the output side of the full wave rectifier 3, and an LED 4 connected in series to the light emitting diode unit. The full wave rectifier 3 is a bridge rectifier circuit comprising four connected diodes, D1, D2, D3, and D4.

Figure 2:
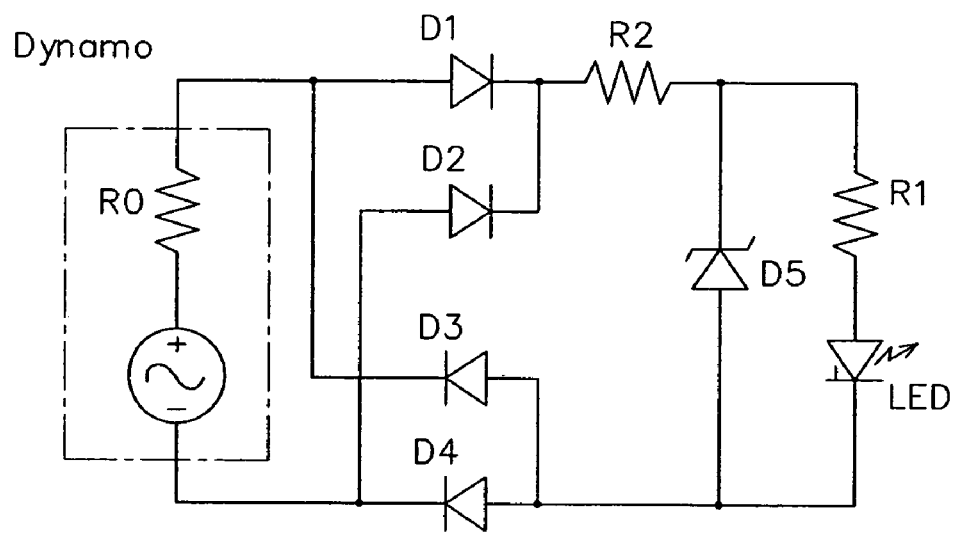
FIG. 2 is a circuit diagram of a prior art lighting device using a protector circuit.

FIG. 2 shows a lighting device in which a common prior art protector circuit is applied. As shown in this drawing, the LED is connected to the generator and via a bridge rectifier circuit. Typically, a current-limiting resistor R1, a voltage-limiting resistor R2, and a Zener diode D5 serve as the LED protector circuit. Thus, when this type of prior art protector circuit is used, it is necessary to provide it with a resistor R2 of sufficiently large capacity to control the generation of heat by the resistor R2 at high speeds. Nevertheless, if the resistor R2 is made larger, the loss at this location becomes significant, and the LED may not illuminate at a lower speed ranges.

The lighting device 1 has a protector circuit that functions according to the internal resistance of the generator 2 and the properties of the LED 4. Thus, the generator 2 has an internal resistance RO including a resistance component and a coil component, and the LED 4 has constant voltage properties. By using the internal resistance RO of the generator 2 in place of the resistor R2 shown in FIG. 2, and the constant voltage properties of the LED 4 in place of the Zener diode D5 shown in FIG. 2, a protector circuit for the LED 4 can be constituted.

Figure 3:
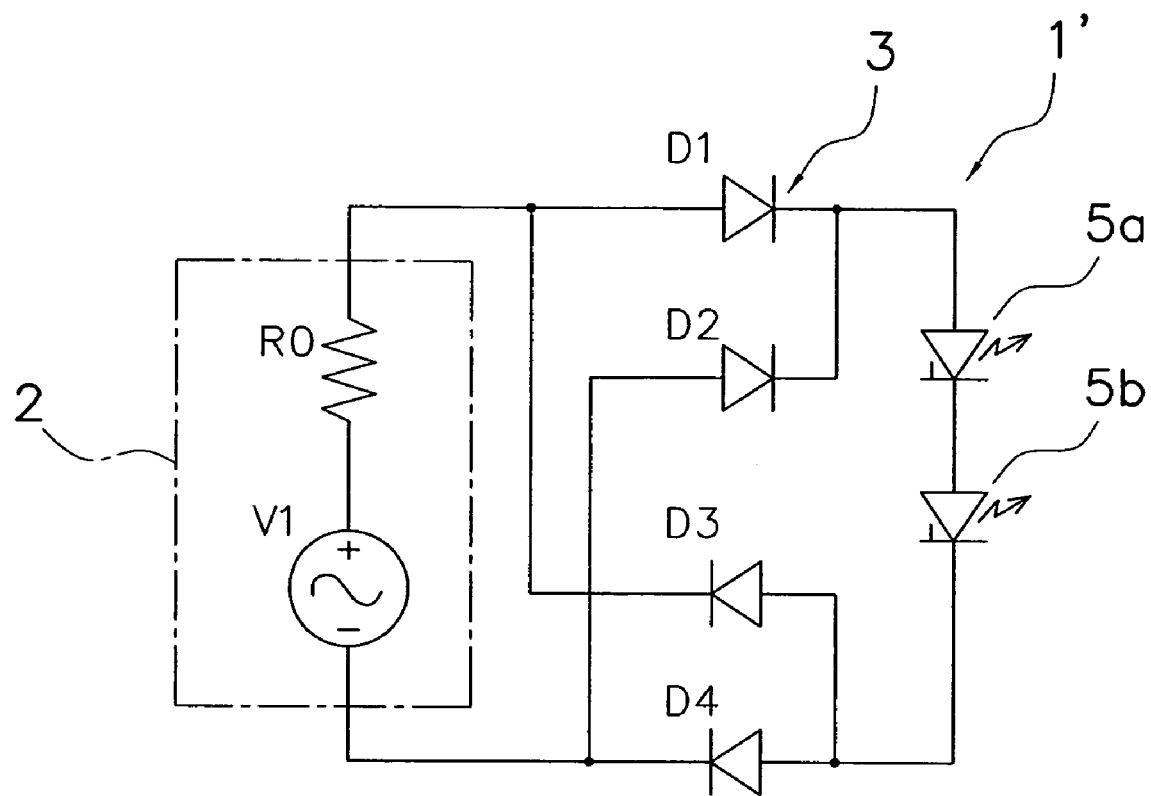
FIG. 3 is a circuit diagram of a variant of the first embodiment of the lighting device of the present invention.

By appropriately balancing the generator 2 internal resistance and the load, the generator 2 output is efficiently applied to the LED 4 and it is possible to configure the described protector circuit in accordance with the present invention. However, it is typically necessary to connect multiple LEDs in series or in parallel to serve as the load for the light emitting diode unit, and not the single LED 4 shown in FIG. 1. The LED unit forward voltage is large in the lighting device 1 shown in FIG. 3 in order to increase the amount of energy applied to the LED. Here, the LED unit consists of two LEDs 5a and 5b connected in series. Also, it is acceptable to configure multiple LEDs in parallel to make an LED unit that controls the current flow to the LEDs.

Figure 4:
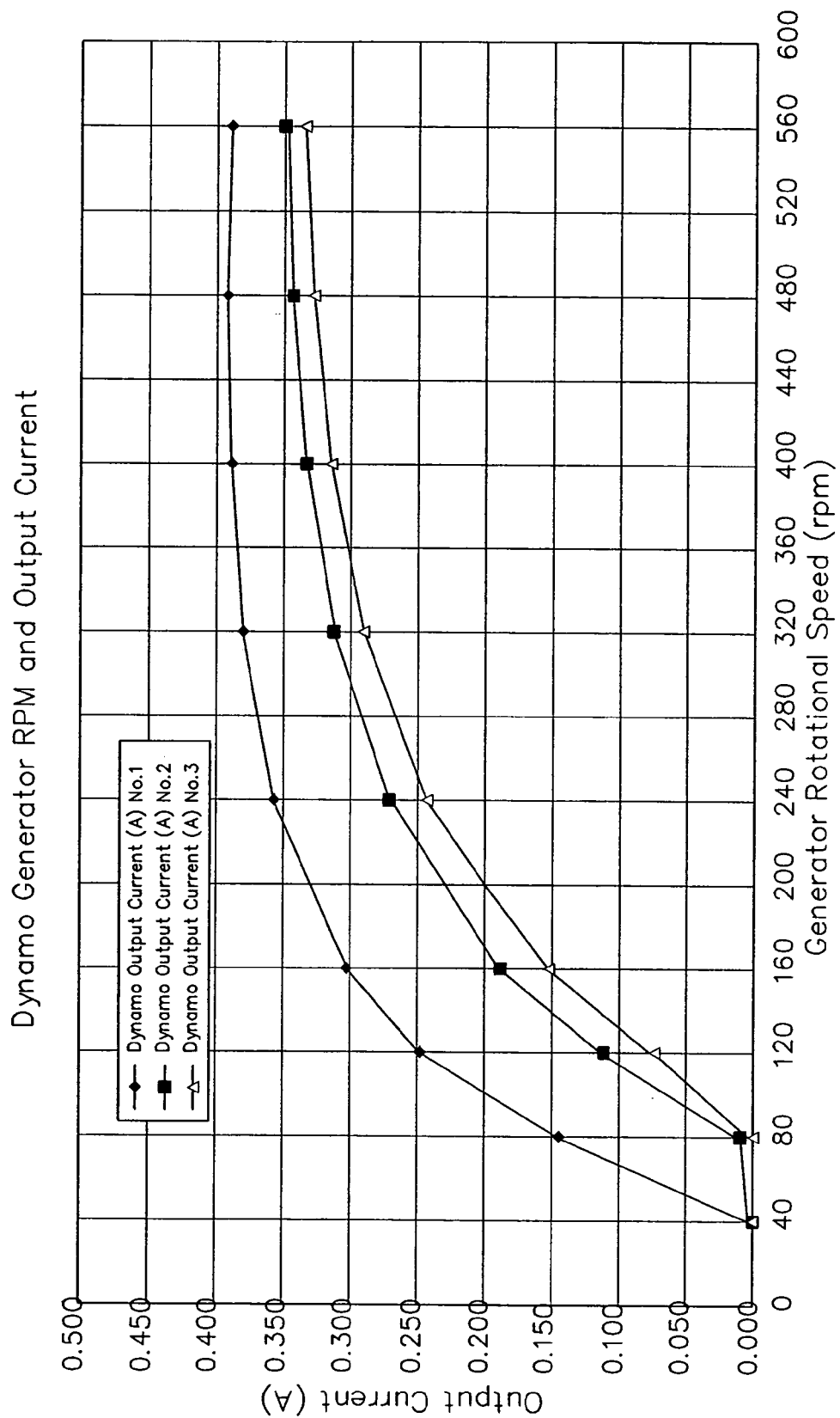
FIG. 4 is a diagram showing the relationship of generator RPM to output current.
Figure 5:
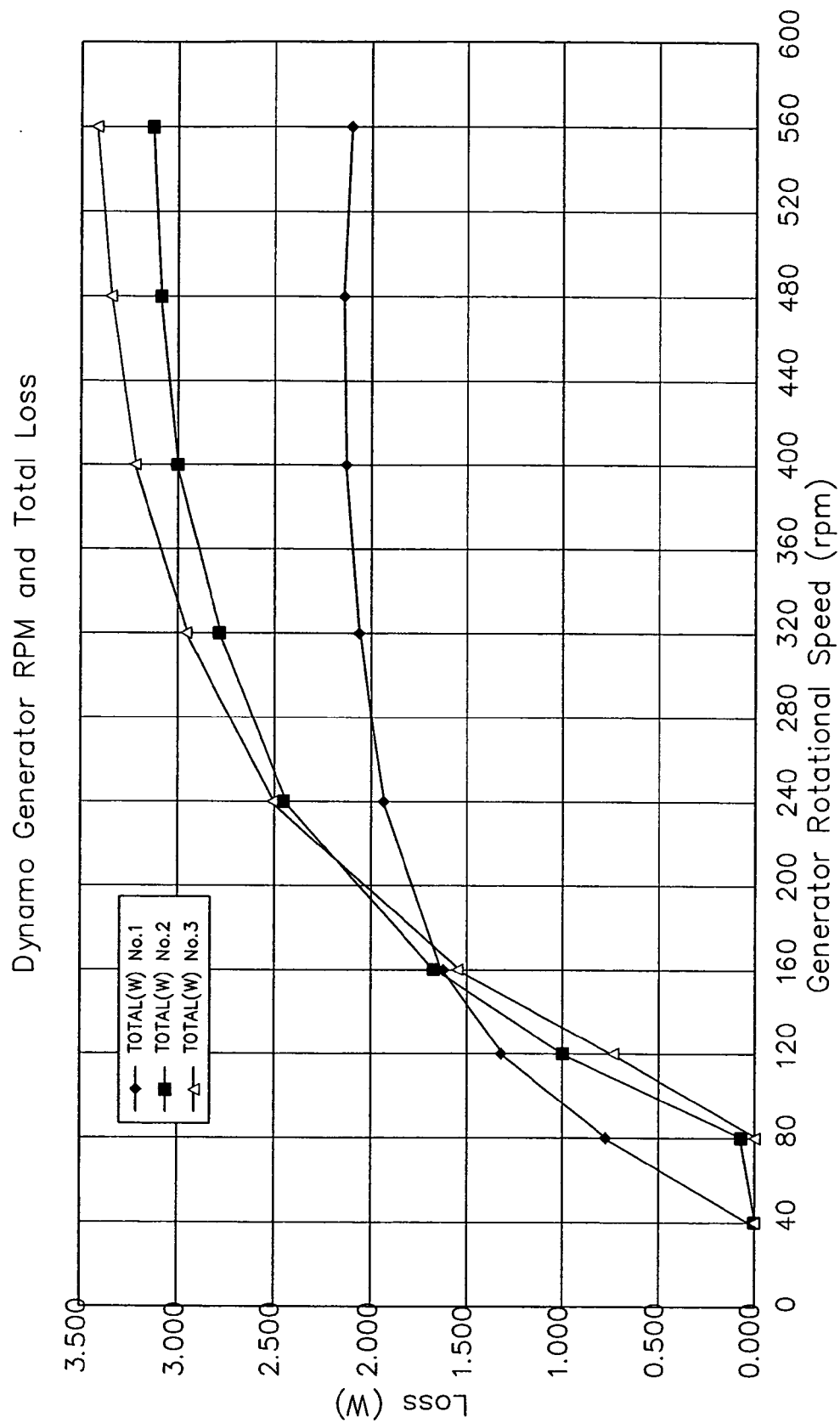
FIG. 5 is a diagram showing the relationship of generator RPM to total loss.
Figure 6:
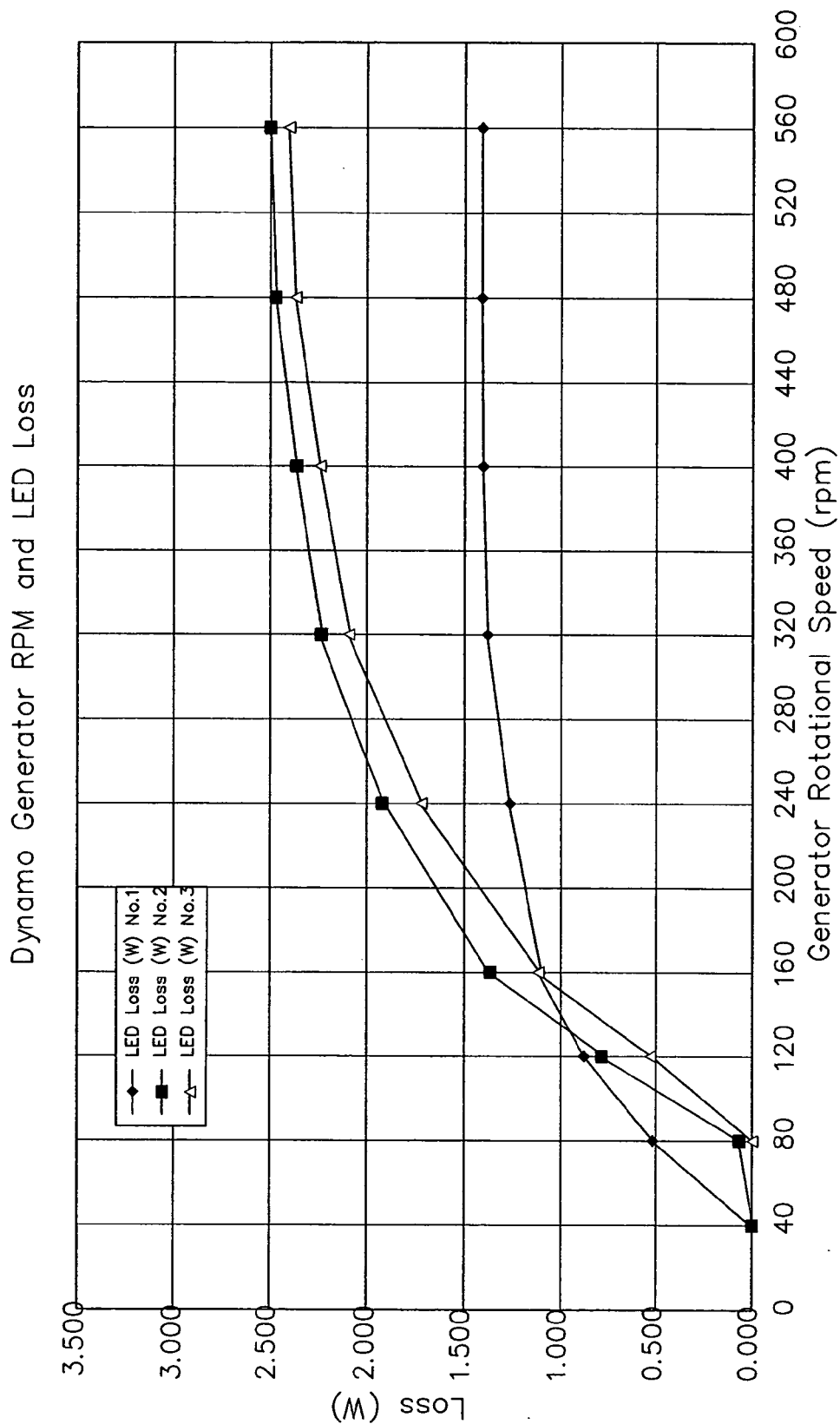
FIG. 6 is a diagram showing the relationship of generator RPM to LED loss.

FIG. 4 shows the relationship between the generator RPM and the output current. FIG. 5 shows the relationship between generator RPM and total circuit loss. FIG. 6 shows the relationship between generator RPM and LED loss. In FIGS. 5 and 6, "No. 1" is the loss properties of a circuit comprising a bridge rectifier and a single LED; "No. 2" is the loss properties of a circuit comprising a bridge rectifier and a 2 LEDs; and "No. 3" is the loss properties of a circuit comprising a bridge rectifier and a regulator circuit. Further, the LED loss shown in FIG. 6 indicates the loss at the LED unit, illustrating that when the loss is large, the LED is brighter.

From these figures that by changing the LED unit constitution which serves as the load, it will be clear to one of ordinary skill in the art the circuit loss and LED loss vary according to specific generators.

Referring to FIG. 6, if, for example, a user places a priority on brightness, then "No. 2" should be selected. However, in this case, the LED cannot be driven at low speed ranges. On the other hand, if priority is given to illumination at lower speed ranges, then "No. 1" should be selected. However, in this case, brightness suffers, at higher speeds.

Typically, the number of LEDs in series (forward voltage) is determined in consideration of whether or not it is important that there be an absolute value for LED brightness in the speed range, a minimum speed range with LED illumination, and a maximum absolute value for brightness. The number of LEDs in parallel is determined according to maximal allowable current value.

Without limiting the present invention, one example of the operation of the lighting device 1 is provided below.

The generator 2 outputs alternating current voltage when a bicycle is in motion and the generator 2 rotates. At the positive alternating current voltage half-cycle, i.e., when the diode in D1 is positive, the current that is outputted from the No. 1 terminal of the generator 2 is supplied to the LED 4 after it has passed through the diode D1. At this point, the LED 4 is driven when the speed range is above that needed to produce the LED 4 forward voltage, and the LED illuminates. The current that passes through LED 4 passes through the diode D4 and returns to the No. 2 terminal of the generator 2.

Next, when polarity is reversed, the current that is an output from the No. 2 terminal of the generator 2 at the alternating voltage negative half-cycle is applied to LED 4 after it has passed through the diode D2. At this point, the LED 4 is driven when the speed range is above that needed to produce the LED 4 forward voltage, and the LED illuminates, as above. The current that passes through LED 4 passes through the diode D3 and returns to the No. 2 terminal of the generator 2.

By repeating the above operations, the LED 4 illuminates for the full cycle when the speed range is above that needed to produce the LED 4 forward voltage.

LED damage can be avoided as described above since the generator and the LED are selected so that the maximum and average values of the current flowing to the LED 4 at the anticipated high speed ranges are controlled within the allowable range.

In the first embodiment described above, when the LED unit comprises LEDs connected in series, the unit forward voltage becomes high, and the LED non-illuminating voltage range ends up falling into the higher speed ranges. Thus, the LED will not illuminate at higher speed ranges.

Figure 7:
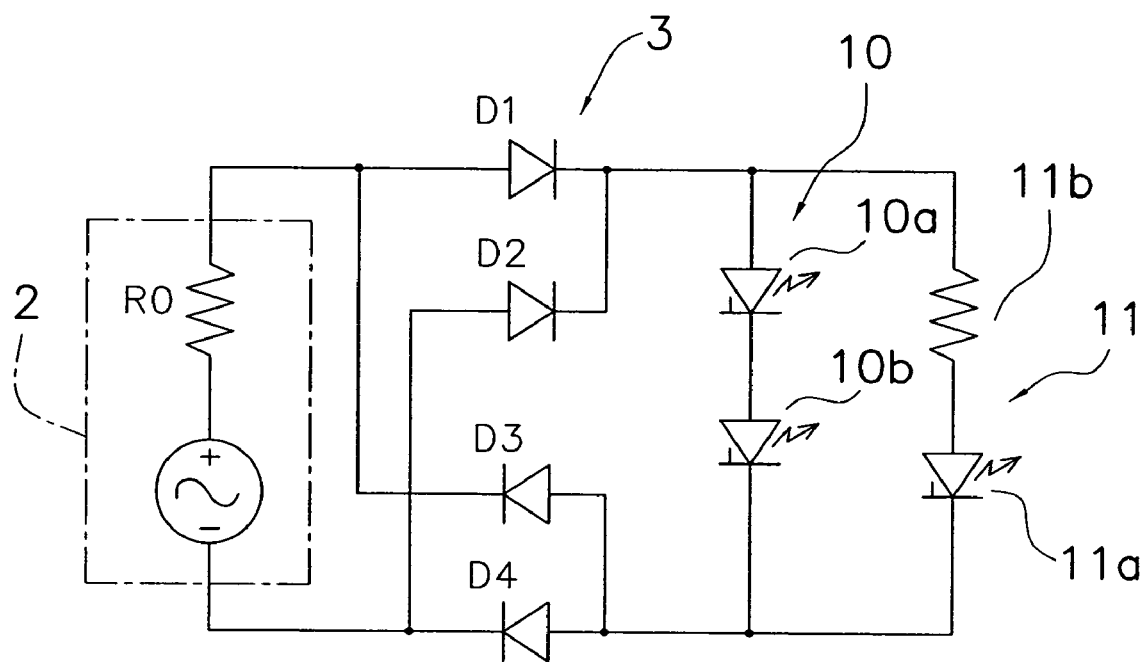
FIG. 7 is a circuit diagram of a lighting device in accordance with another embodiment of the present invention.

FIG. 7, for example, shows an embodiment intended to eliminate this problem. In this embodiment, two LEDs 10*a* and 10*b* that are connected in series form LED unit 10 which is connected in parallel to an auxiliary LED unit 11. Auxiliary LED unit 11 comprises LED 11*a* and resistor 11*b*, connected in series. In view of the similarity between the first and present embodiments, the parts of the present embodiments that are identical to the parts of the first embodiment will be given the same reference numerals as the parts of the first embodiment. Moreover, the descriptions of the parts of the present embodiment that are identical to the parts of the first embodiment may be omitted for the sake of brevity.

The forward voltage of the auxiliary LED unit 11 is lower than the forward voltage of the LED unit 10. Therefore, at speeds lower than that which the LED unit 10 can be illuminated, the auxiliary LED unit 11 can be illuminated.

Moreover, since voltages exceeding the voltages applied to the LED unit 10, are not applied to the auxiliary LED unit 11, there is no need for special elements or circuits in order to protect the auxiliary unit 11.

Further, it is possible to control excessive energy applied to the LED unit 10 at high speeds by varying the resistance value of the resistor 11*b*, or by providing multiple arrays of resistors 11*b* and LEDs 11*a*.

Figure 8:
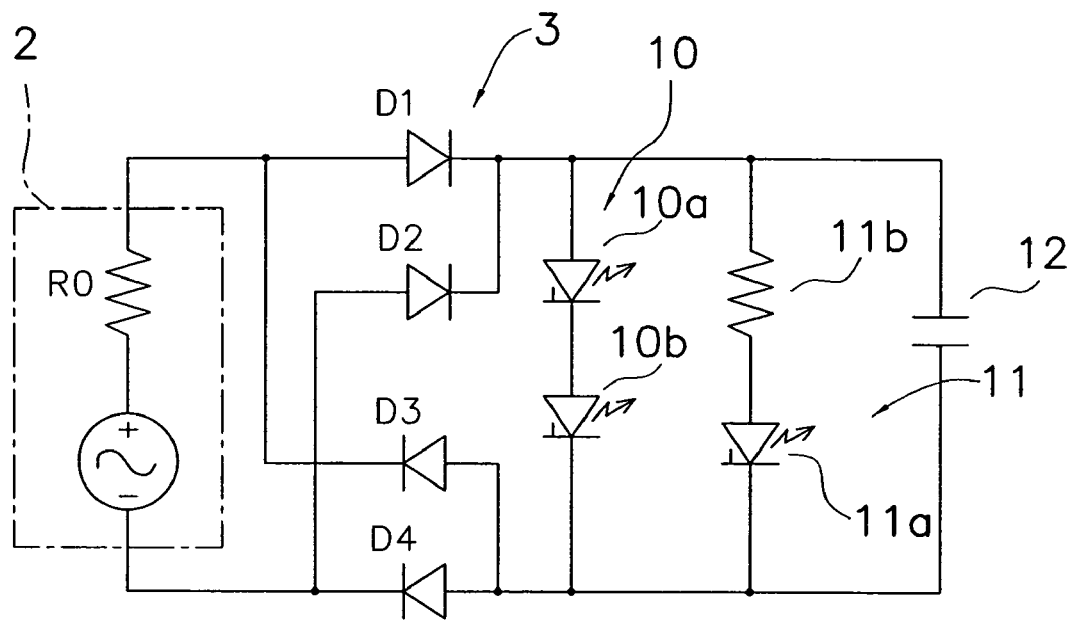
FIG. 8 is a circuit diagram of a lighting device in accordance with another embodiment of the present invention.

FIG. 8 shows another non-limiting embodiment of the present invention. In this embodiment, a smoothing condenser 12 has been connected in parallel with the LED unit 11. In view of the similarity between the first and present embodiments, the parts of the present embodiments that are identical to the parts of the first embodiment will be given the same reference numerals as the parts of the first embodiment. Moreover, the descriptions of the parts of the present embodiment that are identical to the parts of the first embodiment may be omitted for the sake of brevity. This configuration provides for control of LED 11*a* flickering by utilizing the smoothing condenser 12. Also, since the amount of voltage applied to the smoothing condenser 12 does not exceed the forward voltage of the LED unit 10, a low-capacity small condenser can be used for the smoothing condenser 12.

Figure 9:
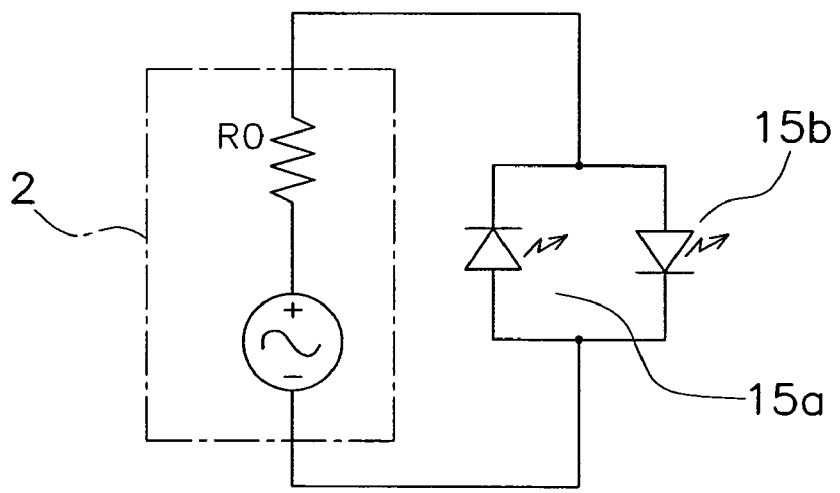
FIG. 9 is a circuit diagram of a lighting device in accordance with another embodiment of the present invention.

A rectifier circuit is provided in each of the above embodiments between the generator and the LED. However, with a circuit that is configured as shown, for example, in FIG. 9, it is possible to omit the rectifier circuits indicated in each of the preceding embodiments. The device has parallel connections between the pair of LEDs 15*a* and 15*b* so that their forward voltages are reversed, respectively.

In this case, at every generator 2 half-cycle, the pair of LEDs 15*a* and 15*b* are driven, and although there is relatively more flicker than in the preceding embodiments, it is possible to create a headlight device with a simpler circuit.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle lighting device comprising:
   a light emitting diode unit having at least one constant voltage light emitting diode that is configured to be illuminated by electrical energy from a bicycle generator, the light emitting diode unit being part of a front bicycle lamp; and
   a protector circuit arranged to limit a flow of current to the light emitting diode unit, the protector circuit including a generator internal resistance component, a rectifier circuit operatively disposed between the generator internal resistance component and the light emitting diode unit, the constant voltage light emitting diode being directly electrically coupled to the rectifier circuit without a resistor electrically disposed therebetween.

2. The bicycle lighting device of claim 1, wherein the light emitting diode unit comprises a plurality of light emitting diodes connected in series.

3. The bicycle lighting device of claim 1, wherein the light emitting diode unit includes a plurality of light emitting diodes connected in parallel.

4. The bicycle lighting device of claim 1, further comprising
   an auxiliary light emitting diode unit connected in parallel with the light emitting diode unit such that a forward voltage of the auxiliary light emitting diode unit is lower than a forward voltage of the light emitting diode unit.

5. A bicycle lighting device comprising:
   a generator internal resistance component;
   a light emitting diode unit having at least two light emitting diodes connected in parallel, the light emitting diode unit being part of a front bicycle lamp;
   a rectifier circuit operatively disposed between the generator internal resistance component and the light emitting diode unit,
   at least one of the light emitting diodes being directly electrically coupled to the rectifier circuit without a resistor electrically disposed therebetween.

* * * * *